(12) United States Patent
Nakano

(10) Patent No.: US 10,020,705 B2
(45) Date of Patent: Jul. 10, 2018

(54) OUTER ROTOR TYPE BRUSHLESS MOTOR

(71) Applicant: MINEBEA CO., LTD., Kitasaku-Gun, Nagano (JP)

(72) Inventor: Tomoaki Nakano, Shimada (JP)

(73) Assignee: Minebea Co., Ltd., Nagano (JP)

( * ) Notice: Subject to any disclaimer, the term of this patent is extended or adjusted under 35 U.S.C. 154(b) by 247 days.

(21) Appl. No.: 14/831,445

(22) Filed: Aug. 20, 2015

(65) Prior Publication Data

US 2016/0065029 A1     Mar. 3, 2016

(30) Foreign Application Priority Data

Aug. 28, 2014   (JP) .................................. 2014-174337

(51) Int. Cl.
*H02K 7/09* (2006.01)
*H02K 5/167* (2006.01)

(52) U.S. Cl.
CPC ............. *H02K 5/1675* (2013.01); *H02K 7/09* (2013.01)

(58) Field of Classification Search
CPC ............................... H02K 7/09; H02K 5/1675
USPC ........................................................... 310/90
See application file for complete search history.

(56) References Cited

U.S. PATENT DOCUMENTS

| | | | | |
|---|---|---|---|---|
| 7,420,304 | B2* | 9/2008 | Sugiyama | ................ H02K 7/09 310/67 R |
| 7,745,968 | B2* | 6/2010 | Kodama | ............... F16C 17/026 310/67 R |
| 2005/0184609 | A1* | 8/2005 | Chen | ....................... F16C 17/08 310/90.5 |
| 2006/0131972 | A1* | 6/2006 | Yang | ....................... F16C 39/06 310/90.5 |
| 2007/0024137 | A1* | 2/2007 | Otsuki | .................... F04D 29/58 310/90 |
| 2007/0120433 | A1 | 5/2007 | Sugiyama et al. | |
| 2012/0235526 | A1 | 9/2012 | Wu | |

FOREIGN PATENT DOCUMENTS

| | | |
|---|---|---|
| JP | 2007-037365 A | 2/2007 |
| JP | 2007-139185 A | 6/2007 |
| JP | 2007-236189 A | 9/2007 |
| JP | 2012-200129 A | 10/2012 |
| JP | 2013-207934 A | 10/2013 |

OTHER PUBLICATIONS

Office Action dated Aug. 1, 2017 in the corresponding Japanese Patent Application 2014-174337.

* cited by examiner

*Primary Examiner* — Forrest M Phillips
(74) *Attorney, Agent, or Firm* — Carrier Blackman & Associates, P.C.; Joseph P. Carrier; Jeffrey T. Gedeon

(57) ABSTRACT

A brushless motor is provided with: a shaft; a rotor; a stator; a cylindrical oil-retaining bearing; a bearing holding part; an attraction magnet disposed at a position facing one end of the shaft and configured to attract the shaft by a magnetic force; and a thrust plate disposed between the attraction magnet and the one end of the shaft, wherein a magnet holder made of a magnetic material is formed integrally to the bearing holding part, the magnet holder being installed with the attraction magnet, and wherein a side of the magnet holder, on which the attraction magnet is installed, is covered by a material for forming the bearing holding part, except for an installation surface on which the attraction magnet is installed, or for a proximity of the installation surface.

8 Claims, 11 Drawing Sheets

OUTER ROTOR TYPE BRUSHLESS MOTOR

BACKGROUND OF THE INVENTION

1. Field of the Invention

The present invention relates to a brushless motor having a shaft retaining structure.

2. Description of the Related Art

Conventionally, there is a structure for rotatably supporting a motor shaft by using an oil-retaining bearing.

In this structure, a method is employed for attracting a leading end of the shaft in an axial direction by a magnet so that the shaft is not pulled out in the axial direction by the rotation.

In the case of using the magnet, a configuration has been suggested for attaching a magnet holder to an outer periphery of the magnet by a metal plate for attracting and fixing the magnet. An example of such configuration is disclosed in JP-A-2007-236189.

The magnet holder disclosed in JP-A-2007-236189 is fixed in the following manner.

In the configuration disclosed in JP-A-2007-236189, a bearing for rotatably supporting the shaft is fixed to a bearing holding part. A recessed shape or hole is formed at a bottom portion of the bearing holding part. The magnet holder is fixed by being press-fitted into the recessed shape or hole formed at the bottom portion of the hearing holding part.

However, in the process of forming the bottom portion of the bearing holding part in the recessed shape and press-fitting the magnet holder into the recessed shape, a small part is inserting into the bottom portion of the healing holding part and additionally applying a pressure for press-fitting the magnet holder therein. Here, during the press-fitting, the small part is subjected to pressure. Therefore, a workability in assembling the motor is poor.

Furthermore, it is essential to install a magnet that is magnetized to the magnet holder made of a magnetic material. Accordingly, the magnet may be stuck to a collar portion of the magnet holder by a magnetic force. As a result, the process may become more complicated.

On the other hand, in the case where a hole is drilled at the bottom portion of the bearing holding part and the magnet holder is press-fitted into the hole, not only the workability is poor, but also there is a possibility that a slight gap occurs between the bottom portion of the bearing holding part and the magnet holder. As a result, there is a possibility that oil in the oil-retaining bearing will leak from the gap. As a method of filling the gap, JP-A-2007-037365 discloses a technique for applying oil-repellent agent to the magnet holder and thus repelling the oil.

However, the oil-repellent agent may solve the problem of oil leakage but may not solve the man-hour problem described above.

SUMMARY OF THE INVENTION

The present invention has been made in consideration of the above situations and an object thereof is to provide a brushless motor that can be easily manufactured with high precision and low cost.

According to an illustrative embodiment of the present invention, there is provided a brushless motor including: a shaft; a rotor that rotates with the shaft; a stator configured to rotate the rotor; a cylindrical oil-retaining bearing through which the shaft is inserted and which rotatably supports the rotor; a bearing holding part having a tubular shape having an outer peripheral face and an inner peripheral face, wherein the stator is fixed to the outer peripheral face and the oil-retaining bearing is fixed to the inner peripheral face; an attraction magnet disposed at a position facing one end of the shaft and configured to attract the shaft by a magnetic force; and a thrust plate disposed between the attraction magnet and the one end of the shaft. A magnet holder made of a magnetic material is formed integrally to the hearing holding part, the magnet holder being installed with the attraction magnet. A side of the magnet holder, on which the attraction magnet is installed, is covered by a material for forming the bearing holding part, except for an installation surface on which the attraction magnet is installed, or for a proximity of the installation surface.

DETAILED DESCRIPTION

Hereinafter, an illustrative embodiment of the present invention will be described in detail with reference to the accompanying drawings.

Figure 1A:
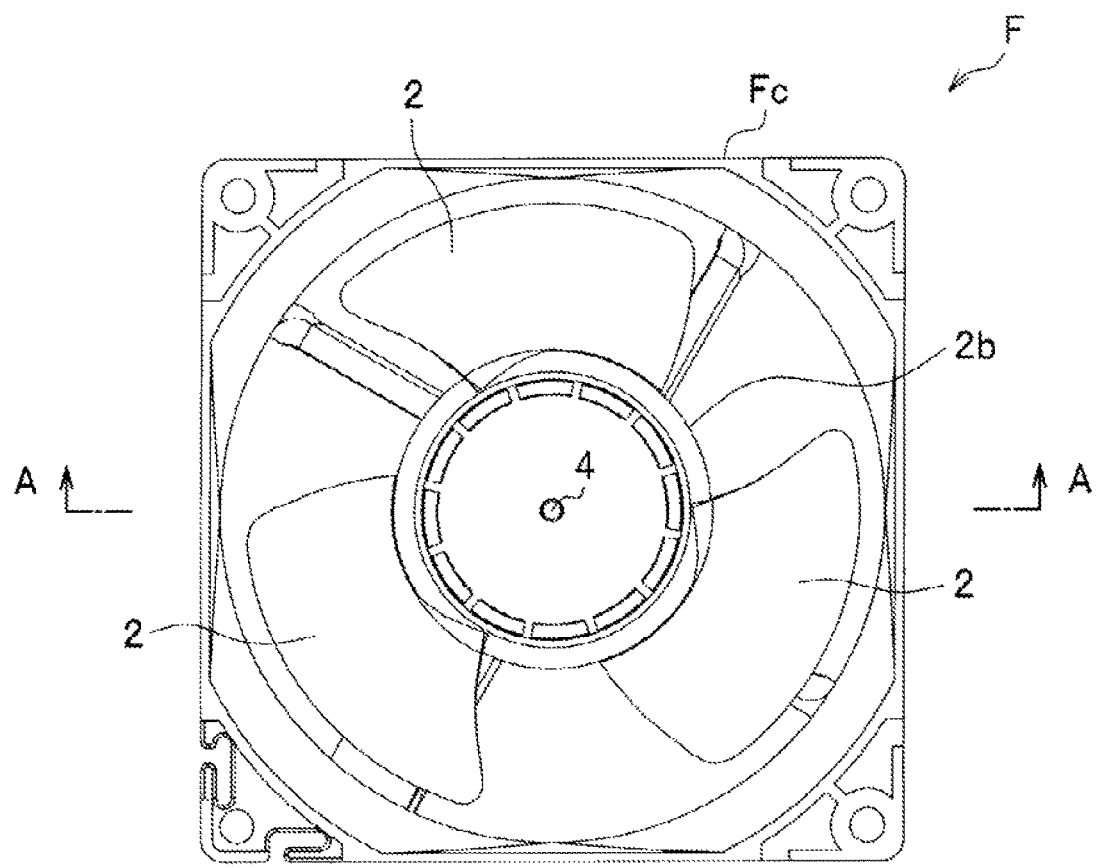
FIG. 1A is a front view showing a fan using a brushless motor according to a illustrative embodiment of the present invention.
Figure 1B:
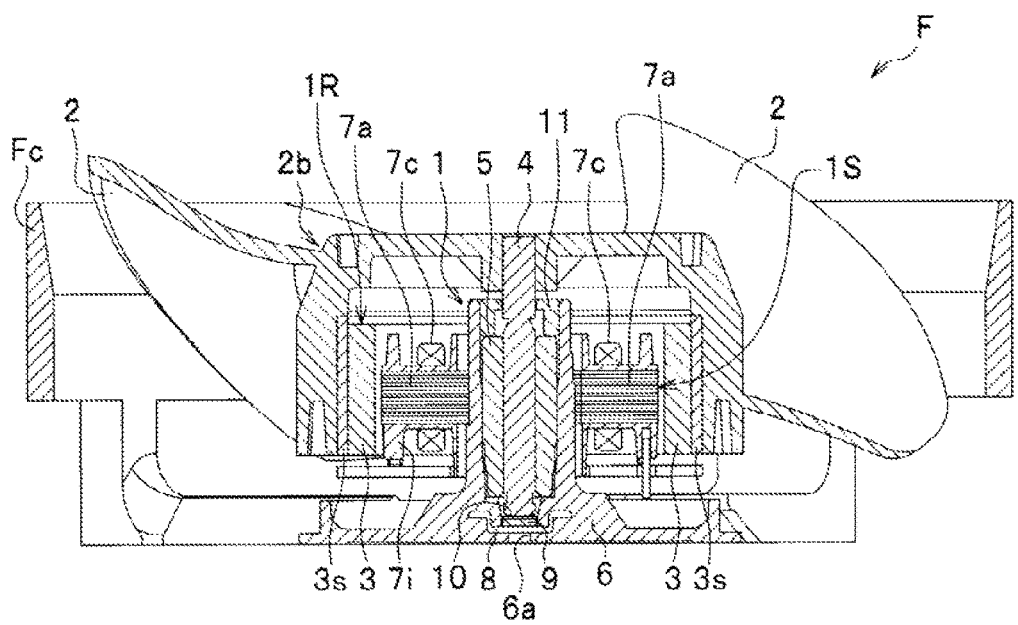
FIG. 1B is a sectional view taken along a line A-A shown in FIG. 1A.

FIG. 1A is a front view showing a fan using a brushless motor according to an illustrative embodiment of the present invention, and FIG. 1B is a sectional view taken along a line A-A shown in FIG. 1A.

Figure 2:
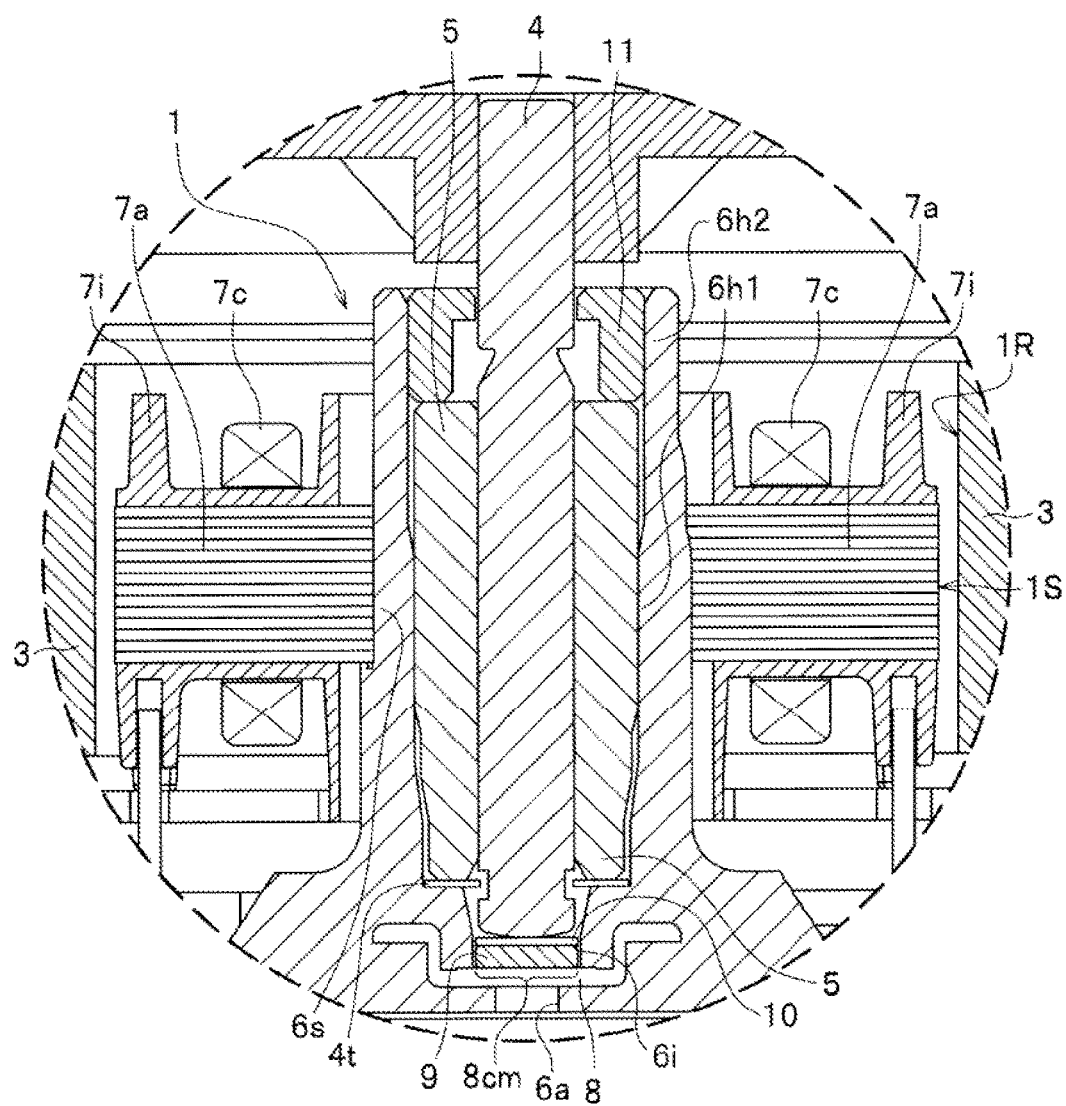
FIG. 2 is an enlarged view of a main portion of the fan using the brushless motor in FIG. 1A, taken along the line A-A.

FIG. 2 is an enlarged view of a main portion of the fan using the brushless motor in FIG. 1A, taken along the line A-A.

A brushless motor 1 of the illustrative embodiment is used in a fan F shown in FIGS. 1A and 1B, for example.

An outline of the fan F is formed by a fan case Fc. A plurality of blades 2 is attached to the central portion of the fan F and causes an air flow.

The brushless motor 1 that rotationally drives the plurality of blades 2 is configured as an outer rotor type motor.

Therefore, a driving magnet 3 configuring a rotor 1R of the brushless motor 1 is attached to a cylindrical rotor yoke 3s, so that the driving magnet 3 is fixed to a blade body 2b. The plurality of blades 2 is formed on the blade body 2b. The cylindrical rotor yoke 3s is made of steel and configures a structural member of the driving magnet 3 and the blade body 2b.

In the driving magnet 3, an N pole and an S pole are multipole-magnetized alternatively in a circumferential direction.

Further, a shaft 4 is fixed to the central portion of the blade body 2b. The rotor 1R of the outer rotor type brushless motor 1 is supported on the shaft 4, so that the rotor 1R is rotated. A coupling portion of the shaft 4 to the blade body 2b is subjected to, for example, a knurling process, so that the shaft 4 and the blade body 2b are rigidly coupled.

The shaft 4 is rotatably supported on an oil-retaining bearing 5. The oil-retaining bearing 5 has a substantially thick cylindrical shape.

The oil-retaining bearing 5 is fixed to a bearing holding part 6 of the brushless motor 1 by a press-fitting process. A stator 1S is fixed to the bearing holding part 6.

The stator 1S is configured in such a way that a stator coil 7c is wound around a stator core 7a across an insulator 7i. A magnetic (ferromagnetic) steel plate such as an electromagnetic steel plate or a silicone steel plate is stacked on the stator core 7a.

Figure 3A:
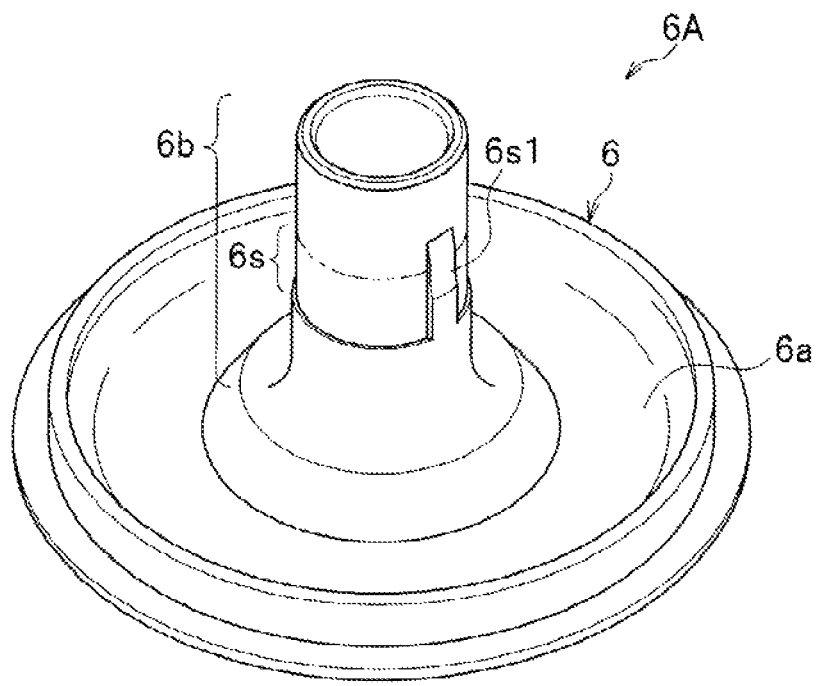
FIG. 3A is a perspective view of a bearing holding member assembly including a bearing holding member in which a magnet holder is incorporated, as seen obliquely from above.
Figure 3B:
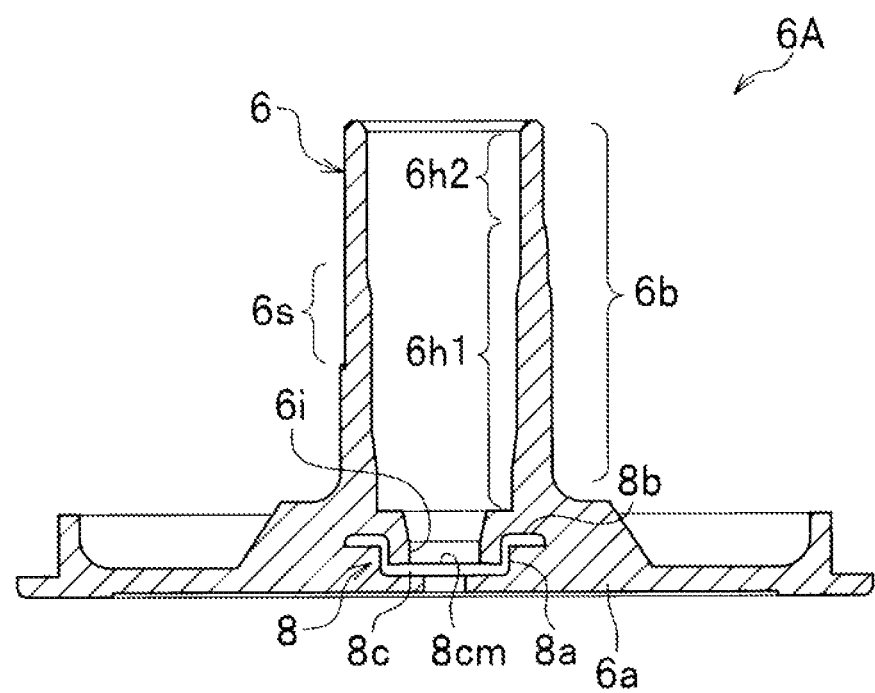
FIG. 3B is a longitudinal sectional view of the bearing holding member assembly.

FIG. 3A is a perspective view of a bearing holding member assembly including a bearing holding member in which a magnet holder is incorporated, as seen obliquely from above, and FIG. 3B is a longitudinal sectional view of the bearing holding member assembly.

A bearing holding member assembly 6A includes the bearing holding part 6 and a magnet holder 8 that is molded integrally in the bearing holding part 6.

The bearing holding part 6 includes a disk portion 6a having a substantially disk shape and a cylinder portion 6b having a substantially cylinder shape. The bearing holding part 6 is formed by an engineering plastic of synthetic resin material, for example. Material of the bearing holding part 6 can be properly selected, so long as the bearing holding part 6 can be molded and a function thereof can be achieved.

The magnet holder 8 is insert-molded integrally with the bearing holding part 6.

Figure 4A:
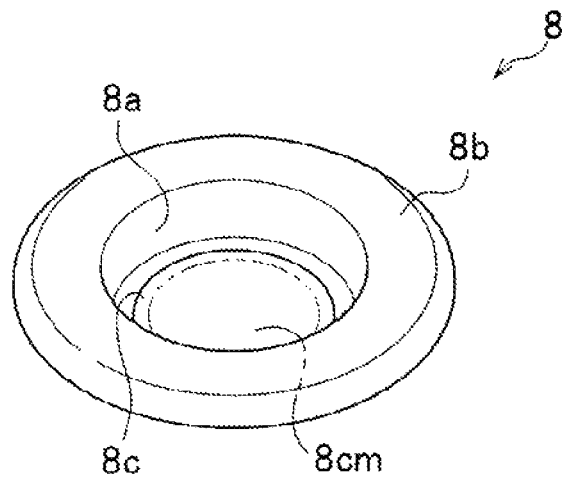
FIG. 4A is a perspective view of the magnet holder.
Figure 4B:
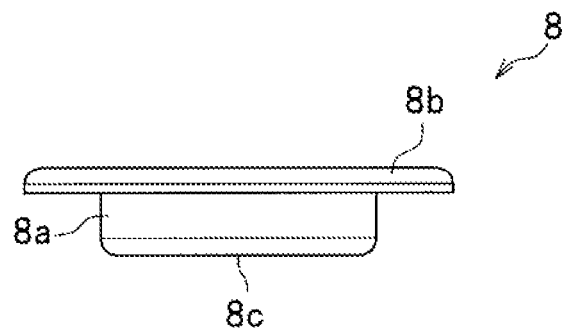
FIG. 4B is a front view of the magnet holder.
Figure 4C:
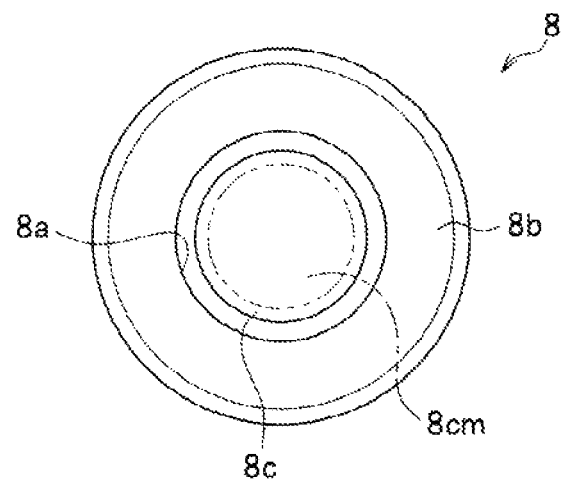
FIG. 4C is a plan view of the magnet holder.

FIG. 4A is a perspective view of the magnet holder, FIG. 4B is a front view of the magnet holder, and FIG. 4C is a plan view of the magnet holder.

From the viewpoints of strength, cost and workability or the like, the magnet holder 8 is formed by pressing a steel plate into a substantially cup shape that has a shallow depth.

As described above, the magnet holder 8 is molded integrally on the bearing holding part 6 by an insert molding. The magnet holder 8 is covered with a resin 6j (see FIG. 7), except for a surface with which an attracting magnet 9 (to be described later) is in contact, or its proximity.

The magnet holder 8 has a cylinder portion 8a, a flange portion 8b and a bottom plate 8c. The cylinder portion 8a has a shallow depth and has a bottomed cylinder shape. The flange portion 8b protrudes outward from a cylindrical end edge on one side of the cylinder portion 8a to form a disk shape. The bottom plate 8c is formed continuously to the other side of the cylinder portion 8a. An attraction magnet 9 for positioning the shaft 4 by attracting the shaft 4 in a thrust direction (axial direction) is attached to the inside of the cylinder portion 8a of the magnet holder 8 (see FIG. 2).

The attraction magnet 9 has a disk shape. The shape of the attraction magnet 9 is optional, so long as the attraction magnet 9 is capable of positioning the shaft 4 by attracting the shaft 4 in the thrust direction (axial direction).

By using a magnetic (ferromagnetic) iron alloy in the magnet holder 8, the attraction magnet 9 is installed by its own magnetic force.

An outer periphery of the flange portion 8b and an inner periphery of the cylinder portion 8a of the magnet holder 8 are set to have a relatively wide dimension. The reason why the inner periphery of the cylinder portion 8a of the magnet holder 8 is wide is to pour the resin 6j (see FIG. 7) for molding the bearing holding part 6 into the cylinder portion 8a. The resin 6j in the cylinder portion 8a is poured to a position proximate to the outer periphery of the disk-shaped attraction magnet 9, so that a cylindrical positioning wall 6i (see FIG. 2 and FIG. 3B) is formed. The cylindrical positioning wall 6i allows the attraction magnet 9 to be positioned in the magnet holder 8.

The reason why the outer periphery of the flange portion 8b of the magnet holder 8 is wide is, for example, to easily maintain the magnet holder 8 during the assembly work, to facilitate the attachment of the resin 6j and to strongly fix the magnet holder 8 in the thrust direction (axial direction) within the bearing holding part 6.

A thrust plate 10 is provided between the shaft 4 and the attraction magnet 9 in the magnet holder 8.

The thrust plate 10 (see FIG. 2) is a component that is intended to prevent the shaft 4 from being in direct contact with the attraction magnet 9. The thrust plate 10 is formed in a disk shape having a thin thickness.

The thrust plate 10 has an effect of reducing an axial loss due to the friction caused by the contact with the shaft 4. Since the shaft 4 is pivotally supported on the thrust plate 10, the thrust plate 10 needs to have excellent wear resistance and low friction.

As the thrust plate 10, a synthetic resin having mechanical strength, wear resistance and formability can be used. For example, PEEK (polyether ether ketone) resin is preferred.

Next, the formation of the bearing holding member assembly 6A where the magnet holder 8 is molded integrally with the bearing holding part 6 will be described.

Figure 5:
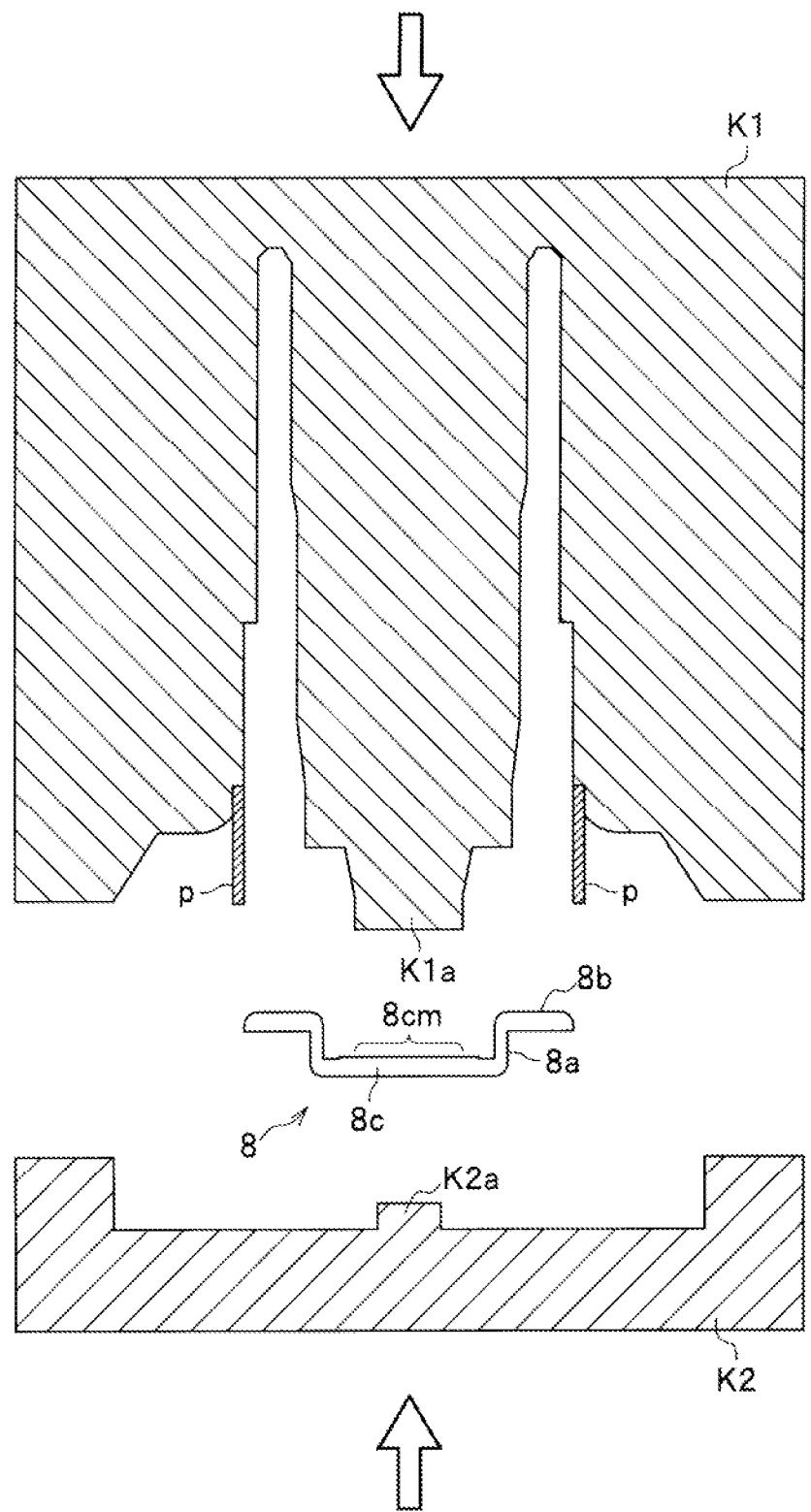
FIG. 5 is a sectional view showing a process of forming the bearing holding member assembly.
Figure 6:
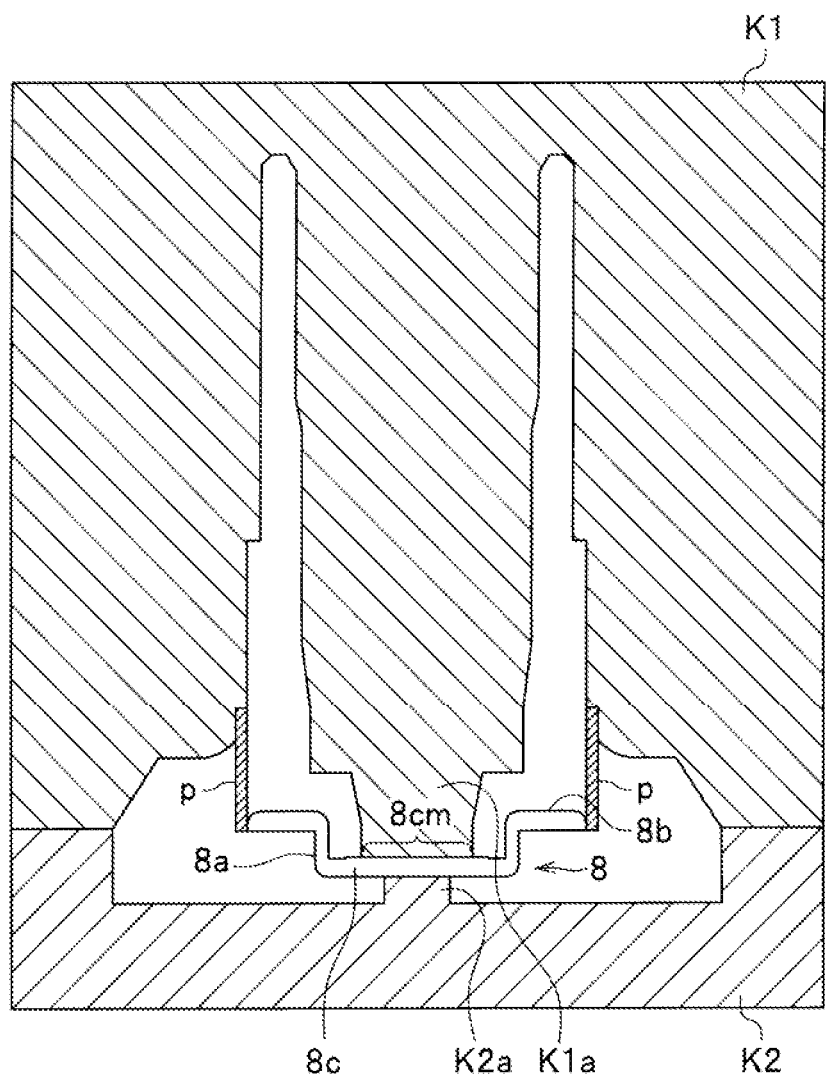
FIG. 6 is a sectional view showing a process of forming the bearing holding member assembly.
Figure 7:
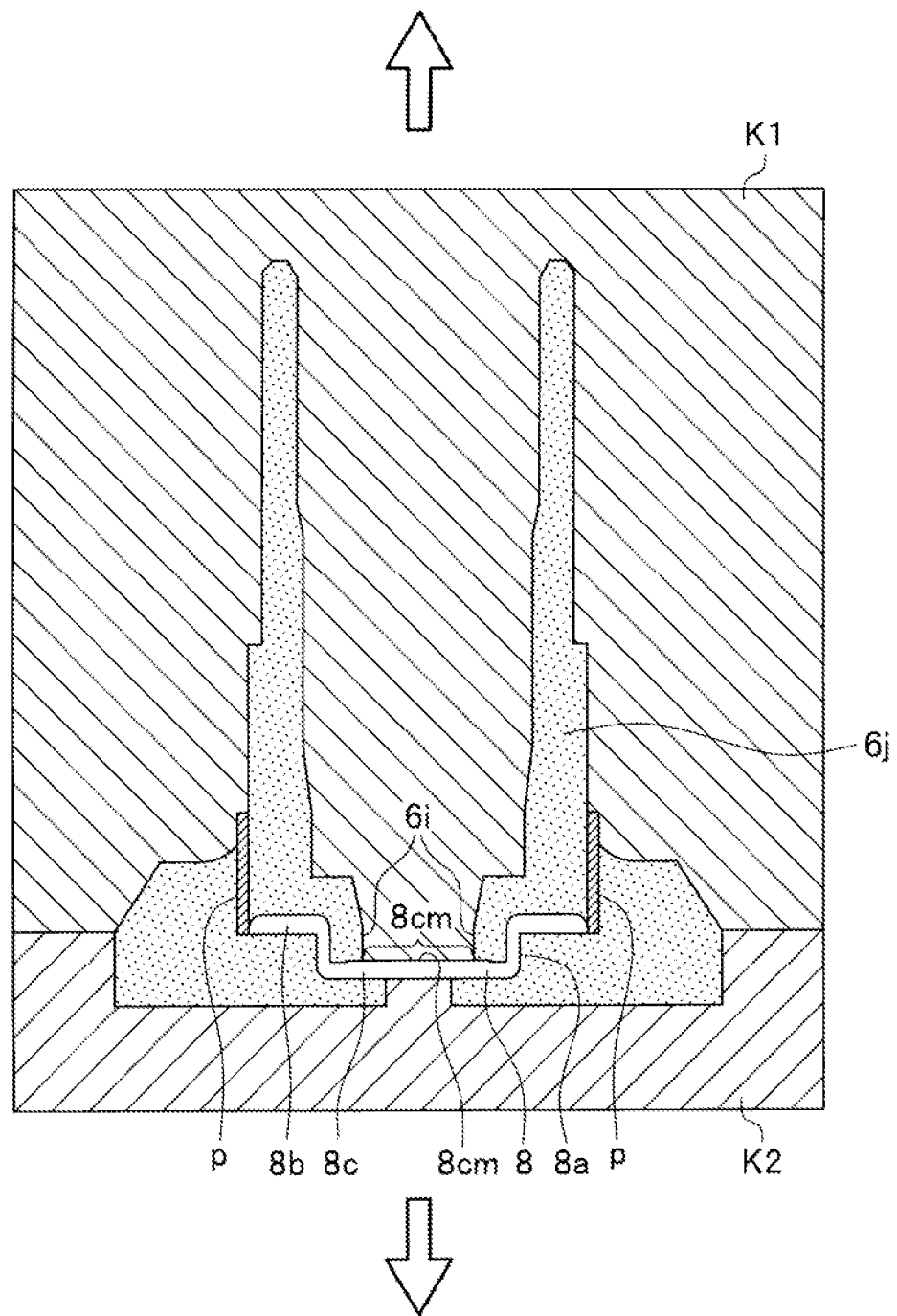
FIG. 7 is a sectional view showing a process of forming the bearing holding member assembly.

FIGS. 5 to 7 are sectional views showing a process of forming the bearing holding member assembly 6A.

As shown in FIG. 5, the cup-shaped magnet holder 8 is placed between an upper mold K1 and a lower mold K2.

The lower mold K2 is formed with a convex portion K2a having a convex shape. The convex portion K2a axially supports a back side of the bottom plate 8c of the cylinder portion 8a of the magnet holder 8. With this configuration, a hole 6a (see FIG. 2) is formed in the portion of the bearing holding part 6 that is provided at the back of the bottom plate 8c of the magnet holder 8. The hole 6a is adapted to support the magnet holder 8 on the lower mold K2.

On the other hand, the upper mold K1 is formed with a convex portion K1a having a convex shape. The convex portion K1a axially supports a front surface of the bottom plate 8c of the cylinder portion 8a of the magnet holder 8.

Further, a plurality of positioning pins p is erected in the upper mold K1. The positioning pins p are adapted to regulate the position in a radial direction of the magnet holder 8 by being brought into contact with an outer periphery of the flange portion 8b of the magnet holder 8. Preferably, three positioning pins p are provided at intervals of about 120 degrees. Further, four or more positioning pins p may be provided for positioning the magnet holder 8 in the radial direction. That is, three or more positioning pins p are formed. The positioning pins p are schematically shown in FIGS. 5 to 7.

Further, FIGS. 5 to 7 schematically show the positioning pins p in a simple form such as a round pin. However, the positioning pin p may have a predetermined thickness and a predetermined circumferential length.

As shown in FIGS. 5 to 7, the upper mold K1 and the lower mold K2 are formed with a concave shape that corresponds to the bearing holding part 6.

Further, as shown in FIG. 6, the bottom plate 8*c* of the magnet holder 8 is sandwiched between the convex portion K2*a* of the lower mold K2 and the convex portion K1*a* of the upper mold K1, so that the magnet holder 8 is axially positioned in the bearing holding part 6. The convex portion K1*a* is abutted against a surface (exposed surface 8*cm*) on which the attraction magnet 9 is placed. In addition, the magnet holder 8 is sandwiched between the positioning pins p described above, so that the magnet holder 8 is radially positioned in the bearing holding part 6.

Here, the positioning pins p are inserted from the side (see FIGS. 3A and 3B) of a stator holding portion 6*s* of the bearing holding part 6. A protrusion 6*s*1 of the stator holding portion 6*s* is intended to regulate the position in the circumferential direction of the stator core 7*a*.

Therefore, the positioning pins p are provided on the inside of the stator holding portion 6*s*. This means that a hole is drilled at the portion for receiving the oil-retaining bearing 5. Accordingly, the positioning pins p are disposed on the outside of the portion of the upper mold K1 where the stator holding portion 6*s* is formed.

As a result, the magnet holder 8 is positioned in the bearing holding part 6.

Further, as shown in FIG. 7, the resin 6*j* of synthetic resin material for forming the bearing holding part 6 is poured into the upper mold K1 and the lower mold K2. Since the inner diameter of the cup-shaped cylinder portion 8*a* of the magnet holder 8 is configured as a large diameter, the resin 6*j* is introduced to a position proximate to an outer peripheral of the attraction magnet 9. In this way, the cylindrical positioning wall 6*i* described above is formed. Furthermore, the flange portion 8*b* provided in an opening portion of the magnet holder 8 is also covered by the resin 6*j* of the bearing holding part 6.

Since the resin 6*j* is filled into the upper mold K1 and the lower mold K2, the surface on the side of the magnet holder 8 for inserting the attraction magnet 9 is entirely covered with the resin 6*j*, except for the exposed surface 8*cm* with which the attracting magnet 9 is in contact, or its proximity.

Then, the filled resin 6*j* is cooled and solidified, and the upper mold K1 and the lower mold K2 are removed, as indicated by an outline arrow in FIG. 7.

In this way, the bearing holding member assembly 6A (see FIGS. 3A and 3B) where the magnet holder 8 is insert-molded to the bearing holding part 6 is molded.

As described above, the positioning pins p for regulating the position in the radial direction of the magnet holder 8 are formed in the upper mold K1 so that the positioning pins are abutted against the outer periphery of the flange portion 8*b* of the magnet holder 8. As a result, holes for the positioning pins p remain in the bearing holding part 6.

Then, the oil-repellent agent is applied on the contact surface with the attraction magnet 9 of the magnet holder 8 molded integrally in the bearing holding part 6. In this way, the oil in the oil-retaining bearing 5 is prevented from being leaked from a small gap or a hole. The small gap remains in the bearing holding part 6 due to the difference of material between the magnet holder 8 and the bearing holding part 6. The hole remains after the positioning pin p for positioning the magnet holder 8 is pulled out.

In addition, the bearing holding part 6 is connected to the fan case FC by a bridging portion, so that an integral structure is formed.

Next, an assembly of the fan F shown in FIGS. 1A and 1B will be described.

The disk-shaped attraction magnet 9 is placed on the exposed surface 8*cm* (see FIG. 3B) of the magnet holder 8 of the bearing holding member assembly 6A that is manufactured through the process of FIGS. 5 to 7.

The attraction magnet 9 is attracted to the magnet holder 8 by its own magnetic force. At this time, as described above, the cylindrical positioning wall 6*i* is formed at the bearing holding part 6 molded integrally with the magnet holder 8. The positioning wall 6*i* is formed at a position proximate to an outer peripheral face of the attraction magnet 9 during the molding. Therefore, just by placing the attraction magnet 9 on the exposed surface 8*cm* of the bearing holding member assembly 6A, the attraction magnet 9 is positioned and fixed along the cylindrical positioning wall 6*i* by its own magnetic force.

Then, the thrust plate 10 (see FIG. 2) is placed on the attraction magnet 9 in the bearing holding member assembly 6A.

Thereafter, the oil-retaining bearing 5 is press-fitted into a central hole 6*h*1 of the bearing holding part 6 of the bearing holding member assembly 6A.

Meanwhile, a shaft retainer 4*t* is inserted to the bottom of the oil-retaining bearing 5. The retainer 4*t* is a ring (E ring) that has a spring property and is discontinuous. As the shaft 4 is pushed, the retainer 4*t* is mounted to a narrow portion (small-diameter portion) in the vicinity of the lower end of the shaft 4.

Then, a bearing retainer 11 is fixed to a central hole 6*h*2 of the bearing holding part 6 of the bearing holding member assembly 6A. The central hole 6*h*2 is located above the oil-retaining bearing 5.

Further, the stator core 7*a* around which the stator coil 7*c* is wound across the insulator 7*i* is fixed to the stator holding portion 6*s* (see FIGS. 3A and 3B) of the bearing holding part 6 by a press-fit or adhesion. A step is provided in the middle of the cylinder portion 6*b* of the bearing holding part 6. The stator core 7*a* of a stator assembly 1Sa is fitted up to the step, so that an axial direction thereof is defined.

Figure 8:
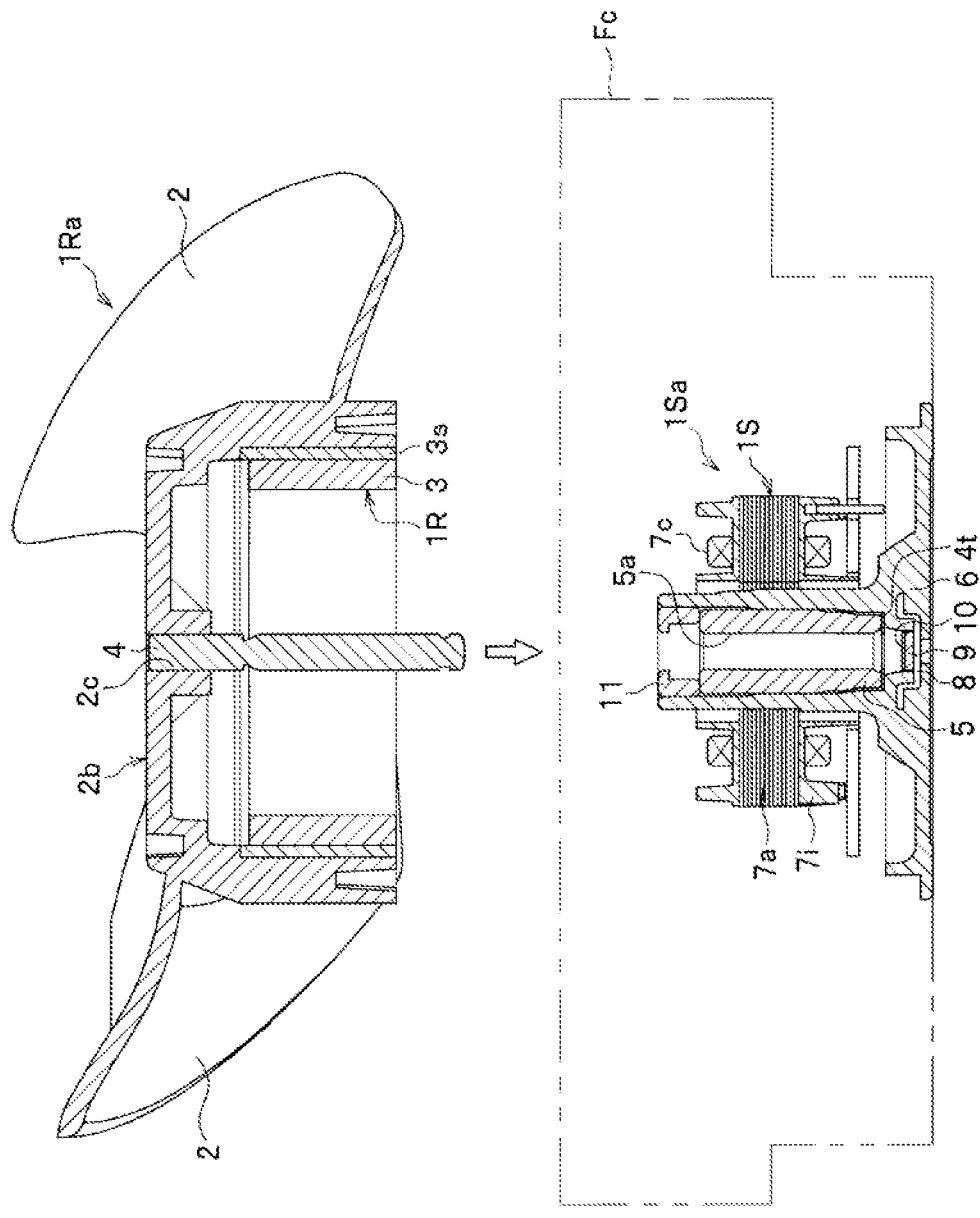
FIG. 8 is a sectional view showing a process of assembling a stator assembly and a rotor assembly of the fan.

In this way, the stator assembly 1Sa (see FIG. 8) of the fan F is completed. FIG. 8 is a sectional view showing a process of assembling a stator assembly and a rotor assembly of the fan. The fan case Fc is fixed to the stator assembly 1Sa.

Meanwhile, the cylindrical rotor yoke 3*s* to which the driving magnet 3 is fixed is fixed to the inside of the blade body 2*b* on the rotor 1R side. Then, the shaft 4 is fixed to a central hole 2*c* of the blade body 2*b* to which the driving magnet 3 is fixed. In this way, a rotor assembly 1Ra (see FIG. 8) of the fan F is completed.

Then, as indicated by an outline arrow in FIG. 8, the shaft 4 of the rotor assembly 1Ra is fitted to a central hole 5*a* of the oil-retaining bearing 5 of the stator assembly 1Sa to which the fan case Fc is fixed. In this way, the fan F (see FIGS. 1A and 1B) is completed.

In the fan F, the shaft 4 of the rotor assembly 1Ra is attracted to the attraction magnet 9 of the stator assembly 1Sa through the thrust plate 10. Therefore, the shaft 4 of the rotor assembly 1Ra is not pulled out from the stator assembly 1Sa.

The method (described above) of assembling the fan F is intended to show an example. Of course, the fan F may be assembled in other methods.

According to the above configurations, the following advantages may be achieved.

1. Since the magnet holder 8 is insert-molded integrally with the bearing holding part 6, the work of mounting the magnet holder 8 at a narrow space is eliminated and therefore the man-hours can be reduced. As a result, the installation workability of the magnet holder 8 is improved.

2. Since the magnet holder 8 is positioned in the upper mold K1 and the lower mold K2, which form the bearing holding part 6, by the positioning pins p, the work accuracy in assembling the magnet holder 8 is improved.

3. The resin 6*j* forming the bearing holding part 6 is poured into the cylinder portion 8*a* of the magnet holder 8, so that the positioning wall 6*i* is formed. In this way, the attraction magnet 9 is guided while being abutted against the positioning wall 6*i*. Accordingly, the attraction magnet 9 is prevented from being attracted to the cylinder portion 8*a* (see FIG. 4A) of the side surface of the magnet holder 8. As a result, the positioning work in assembling the attraction magnet 9 is not necessary, so that the positioning work is eliminated.

4. Since the attraction magnet 9 is guided while being abutted against the positioning wall 6*i*, the work accuracy in assembling the attraction magnet 9 is improved.

5. Even when the magnet holder 8 is insert-molded to the bearing holding part 6 as described above, a small gap is formed due to the difference of material between the magnet holder 8 and the bearing holding part 6 or a hole remains after the positioning pin p fixed to the upper mold K1 and provided for positioning the magnet holder 8 is pulled out. For this reason, the oil-repellent agent is applied on the contact surface with the attraction magnet 9 of the magnet holder 8 in order to prevent the oil in the oil-retaining hearing 5 from being leaked from the small gap or the hole. In this way, the oil-repellent agent is introduced to the small gap or the hole by the capillary action of the oil-repellent agent. As a result, the oil-repellent agent is present in the small gap or the hole. Accordingly, the oil in the oil-retaining bearing 5 does not enter the small gap or the hole by the surface tension of the oil in the oil-retaining bearing 5. In this way, the leakage of the oil in the oil-retaining bearing 5 is prevented.

In the above-described embodiment, the magnet holder 8 is positioned in the bearing holding part 6 in such a way that the positioning pins p are provided in the upper mold K1 and abutted against the outer periphery of the flange portion 8*b* of the magnet holder 8. However, the magnet holder 8 may be positioned in the bearing holding part 6 in such a way that the positioning pins p are provided in the lower mold K2 instead of the upper mold K1 and abutted against the outer peripheral surface of the cylinder portion 8*a* or the outer periphery of the flange portion 8*b* of the magnet holder 8. In this case, it is not necessary to provide the positioning pins p at positions on the outside of the stator holding portion 6*s*. Accordingly, the selection region for the position of the positioning pins p is widened.

Figure 9A:
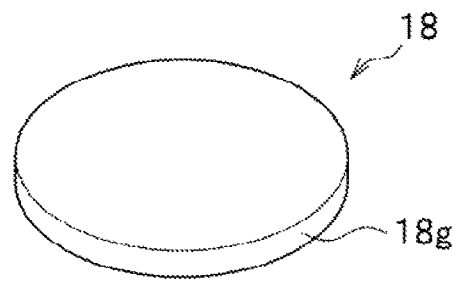
FIG. 9A is a perspective view showing a magnet holder of a first modification and FIG. 9B is a view of the first modification corresponding to the A-A section of FIG. 1B.
Figure 9B:
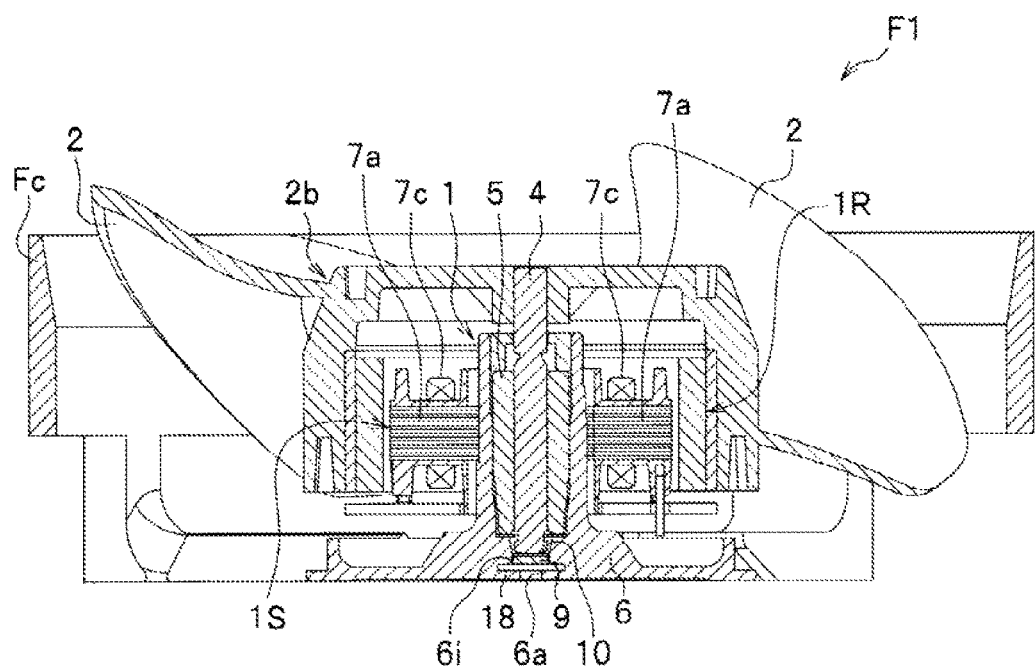

FIG. 9A is a perspective view showing a magnet holder of a first modification and FIG. 9B is a view of the first modification corresponding to the A-A section of FIG. 1B.

A fan F1 of the first modification has a disk-shaped magnet holder 18. Other configurations are the same as in the first embodiment. Accordingly, the same components are denoted by the same reference numerals as in the first embodiment and a detailed description thereof is omitted.

The magnet holder 18 of the first modification has a flat plate shape and is insert-molded to the bearing holding part 6.

Upon being insert-molded to the bearing holding part 6, the magnet holder 18 is positioned in such a way that the positioning pins p provided in the upper mold K1 or the lower mold K2 is abutted against an outer peripheral surface 18*g* of the magnet holder 18.

According to the first modification, the magnet holder 18 is formed as a flat plate shape. Therefore, press work is completed by punching, so that the magnet holder 18 is manufactured in a very easy manner.

Further, since the magnet holder 18 is miniaturized, the amount of material of the magnet holder 18 is reduced and the material cost is thus reduced. From the above, the manufacturing cost is reduced.

Meanwhile, the magnet holder may have a shape other than the disk shape, such as a square shape, a shape having a curve, and a shape having a curve and a straight line, so long as the magnet holder 18 has a flat plate shape. The shape of the magnet holder can be arbitrarily selected.

Figure 10A:
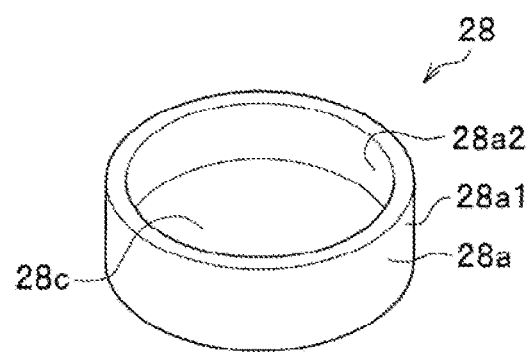
FIG. 10A is a perspective view showing a magnet holder of a second modification and FIG. 10B is a view of the second modification corresponding to the A-A section of FIG. 1B.
Figure 10B:
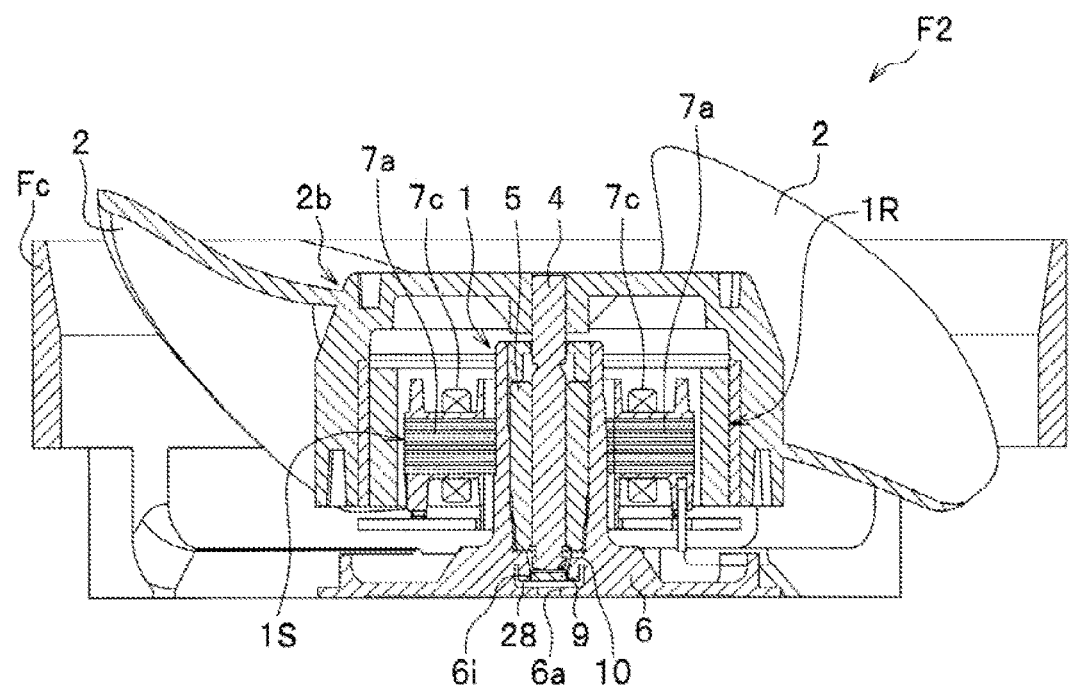

FIG. 10A is a perspective view showing a magnet holder of a second modification and FIG. 10B is a view of the second modification corresponding to the A-A section of FIG. 1B.

A fan F2 of the second modification includes a magnet holder 28 that has a cup shape with no flange portion.

Other configurations are the same as in the first embodiment. Accordingly, the same components are denoted by the same reference numerals as in the first embodiment and a detailed description thereof is omitted.

The magnet holder 28 of the second modification has a bottomed cylinder shape where there is no flange portion.

The magnet holder 28 is formed to include a cylinder portion 28*a* having a cylinder shape and a bottom plate 28*c* having a flat plate shape by a press work.

Upon being insert-molded to the bearing holding part 6, the magnet holder 28 is positioned in such a way that the positioning pins p provided in the upper mold K1 or the lower mold K2 are abutted against an outer wall surface 28*a*1 or an inner wall surface 28*a*2 of the cylinder portion 28*a* of the magnet holder 28.

According to the second modification, the magnet holder 28 is configured as a cup shape with no flange portion. Therefore, the magnet holder 28 is manufactured in an easy manner.

Further, since the magnet holder 28 is miniaturized, the amount of material of the magnet holder 28 is reduced and the material cost is thus reduced. From the above, the manufacturing cost is reduced.

As compared to the first modification, the strength of the magnet holder 28 itself is improved and the attachment of the resin 6*j* forming the bearing holding part 6 is enhanced, so that the strength of the magnet holder 28 is improved.

In the above-described embodiments and the second modification, an example has been described where the magnet holders 8, 28 are formed in a bottomed cylindrical shape. However, the magnet holders 8, 28 may be formed in a bottomed square shape or a bottomed shape having a curved plate and a flat plate, as long as the magnet holder can meet the configurations in the scope of the claims. The shape of the magnet holders 8, 28 can be arbitrarily selected.

The present invention is not limited to the above-described embodiments but includes various embodiments. For example, the above-described embodiments are intended to clarify the present invention. The present invention is not intended to be limited to essentially include all of the configurations described above. For example, the present invention may include only a portion of the configurations described above.

What is claimed is:

1. A brushless motor comprising:
a shaft;
a rotor that rotates with the shaft;
a stator configured to rotate the rotor;
a cylindrical oil-retaining bearing through which the shaft is inserted and which rotatably supports the rotor;
a bearing holding part made of resin material, the bearing holding part having a tubular shape having an outer peripheral face and an inner peripheral face, wherein the stator is fixed to the outer peripheral face and the oil-retaining bearing is fixed to the inner peripheral face;
an attraction magnet disposed at a position facing one end of the shaft and configured to attract the shaft by a magnetic force; and
a thrust plate disposed between the attraction magnet and the one end of the shaft; and
a magnet holder made of a magnetic material and being molded within the bearing holding part, the magnet holder having an installation surface on which the attraction magnet is placed,
wherein the bearing holding part has a positioning wall surface that is disposed to face a circumferential side face of the attraction magnet, the positioning wall surface being configured to position the attraction magnet on the installation surface of the magnet holder by guiding the circumferential side face of the attraction magnet.

2. The brushless motor according to claim 1,
wherein oil-repellent agent is applied on the installation surface of the magnet holder.

3. The brushless motor according to claim 1,
wherein the magnet holder further includes a side plate that surrounds the circumferential side face of the attraction magnet, a bottom plate that includes the installation surface and is formed continuously from a lower edge of the side plate, and a flange portion extending outward from an upper edge of side plate, and
wherein the positioning wall surface of the bearing holding part inside a space defined by the side plate and the bottom plate.

4. The brushless motor according to claim 1,
wherein the magnet holder further includes a side plate that surrounds the circumferential side face of the attraction magnet, a bottom plate that includes the installation surface and is formed continuously from a lower edge of the side plate, and an opening that opens above the bottom plate, and
wherein the positioning wall surface of the bearing holding part is located at a position inside a space defined by the side plate and the bottom plate.

5. The brushless motor according to claim 1,
wherein the magnet holder has a flat plate shape, and
wherein a lower end of the positioning wall surface of the bearing holding part is provided on an upper surface of the magnet holder.

6. The brushless motor according to claim 1,
wherein the magnet holder has a flat bottom plate including the installation surface, and
wherein the positioning wall surface is arranged at a position closer to a center of the shaft with respect to a circumferential edge of the bottom plate.

7. The brushless motor according to claim 1,
wherein the magnet holder has a bottom plate including the installation surface and a side plate extending upward toward the stator from a circumferential edge of the bottom plate, and
wherein the positioning wall surface is arranged at a position closer to a center of the shaft with respect to the circumferential edge of the bottom plate and to the side plate.

8. The brushless motor according to claim 1,
wherein the magnet holder has a bottom plate including the installation surface, a side plate extending upward toward the stator from a circumferential edge of the bottom plate, and a flange portion extending outward from the side plate, and
wherein the positioning wall surface is arranged at a position closer to a center of the shaft with respect to the circumferential edge of the bottom plate and to the side plate.

* * * * *